(12) United States Patent     (10) Patent No.:   US 12,675,403 B1
Chen et al.     (45) Date of Patent:   ***Jul. 7, 2026

(54) CHIPLET ARCHITECTURE DATA PROCESSING DEVICES AND METHODS

(71) Applicant: Google LLC, Mountain View, CA (US)

(72) Inventors: Xi Chen, San Jose, CA (US); Chao Ni, Sunnyvale, CA (US); Jakob Raymond Jones, San Jose, CA (US)

(73) Assignee: Google LLC, Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/760,520

(22) Filed: Jul. 1, 2024

Related U.S. Application Data

(63) Continuation of application No. 18/081,939, filed on Dec. 15, 2022, now Pat. No. 12,038,837.

(51) Int. Cl.
    *G06F 12/06*     (2006.01)
    *G06F 9/54*     (2006.01)
    *G06F 13/40*     (2006.01)

(52) U.S. Cl.
    CPC .......... *G06F 12/0692* (2013.01); *G06F 9/546* (2013.01); *G06F 13/404* (2013.01)

(58) Field of Classification Search
    CPC ..... G06F 12/0692; G06F 9/546; G06F 13/404
    See application file for complete search history.

(56) References Cited

U.S. PATENT DOCUMENTS

| | | | |
|---|---|---|---|
| 7,010,666 B1 * | 3/2006 | Barber ................. | G06F 12/063 |
| | | | 711/E12.082 |
| 7,710,754 B2 | 5/2010 | Kao | |

| | | | |
|---|---|---|---|
| 8,001,266 B1 | 8/2011 | Gonzalez et al. | |
| 9,570,132 B2 | 2/2017 | Kim et al. | |
| 10,282,309 B2 | 5/2019 | Jayasena et al. | |
| 2004/0230735 A1 | 11/2004 | Moll | |
| 2009/0177823 A1 | 7/2009 | Chao | |
| 2010/0077127 A1 * | 3/2010 | Gupte ................. | G06F 13/4022 |
| | | | 710/317 |
| 2012/0271924 A1 | 10/2012 | Spitaels et al. | |
| 2014/0241080 A1 | 8/2014 | Kim | |
| 2016/0205066 A1 | 7/2016 | Attarwala et al. | |
| 2019/0243700 A1 | 8/2019 | Brewer | |
| 2020/0409859 A1 * | 12/2020 | Saleh ................. | G06F 15/7807 |

(Continued)

OTHER PUBLICATIONS

Office Action for European Patent Application No. 23174853.4 dated Apr. 1, 2025. 6 pages.

(Continued)

*Primary Examiner* — Henry Tsai

*Assistant Examiner* — Harry Z Wang

(74) *Attorney, Agent, or Firm* — Lerner David LLP

(57)         ABSTRACT

A data processing device incorporates a plurality of chiplets having working elements such as processing and memory elements. At least one of the working elements is operative to generate messages directed to working elements of the same chiplet or another one of the chiplets. Each message includes a global address. An evaluation circuit determines whether the global address of a message is within a range of global addresses assigned to the chiplet. If so, the message passes to a translation circuit which translates the message to a local address for routing to a working element of the chiplet. If not, the message is dispatched to one or more other chiplets.

19 Claims, 4 Drawing Sheets

(56)     References Cited

U.S. PATENT DOCUMENTS

| | | | |
|---|---|---|---|
| 2021/0150663 | A1  | 5/2021 | Maiyuran et al. |
| 2022/0283967 | A1  | 9/2022 | Makhervaks et al. |
| 2023/0035610 | A1* | 2/2023 | Lee ..................... G06F 12/0831 |
| 2023/0041617 | A1* | 2/2023 | Israel Vijayponraj ...................... G06F 15/7807 |

OTHER PUBLICATIONS

Extended European Search Report for European Patent Application No. 23174853.4 dated Oct. 27, 2023. 10 pages.
Paraskevas et al. Scaling the Capacity of Memory Systems; Evolution and Key Approaches. Proceedings of the International Symposium on Memory Systems , MEMSYS '19, ACM Press, New York, New York, USA, Sep. 30, 2019(Sep. 30, 2019), pp. 235-249.

* cited by examiner

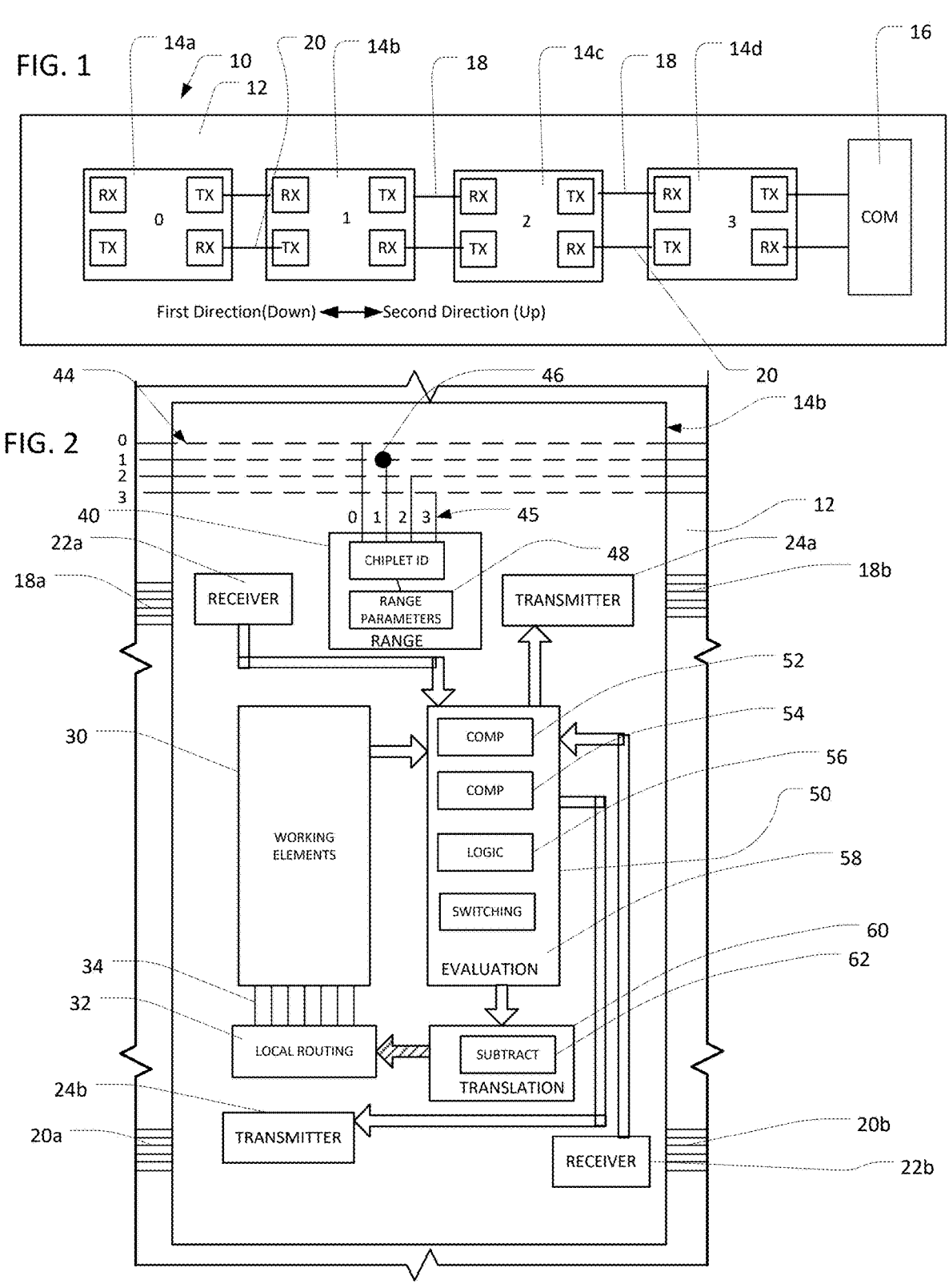

CHIPLET ARCHITECTURE DATA PROCESSING DEVICES AND METHODS

CROSS-REFERENCE TO RELATED APPLICATIONS

This application is a continuation of U.S. application Ser. No. 18/081,939, filed on Dec. 15, 2022, the disclosure of which is incorporated herein by reference.

BACKGROUND

The present disclosure relates to chiplet devices used in computing. Conventional computers incorporate semiconductor chips which may include millions of individual elements such as transistors formed on a single piece of a semiconductor such as silicon. For example, a processor chip may include arithmetic processing elements and numerous other ancillary circuits. The chip typically is mounted on a package substrate which in turn is mounted on a larger circuit board to connect the chip to other elements of the computer.

Many modern computers require multiple processing elements, which operate in parallel with one another. Although it is possible to form all of the processing elements and all of the ancillary circuits in a single large chip, it is expensive to do so. As the size of a chip increases, the probability of a defect somewhere in the chip increases. Because a single defect can render the entire chip unusable, the yield of usable chips decreases with chip size. It is more economical to form a multiprocessor device by making a plurality of small chips, each incorporating some processing capability, and mounting these to a common package substrate, most typically along with other components to handle tasks such as communication with elements external to the substrate. The term "chiplet" as used in this disclosure refers to an individual chip in such a device. The chiplets are interconnected with one another by electrical conductors on the substrate, so that the chiplets can communicate with one another. Most typically, the chiplets are structurally identical with one another. That is, the physical elements of each chiplet are identical with one another.

The term "working elements" as used herein refers to the elements of a chiplet which process or store information. The working elements of the chip communicate with one another during operation. For example, a processing element may react to an instruction in the software running on the chiplet to produce a number as the result of a calculation and send that number to a particular memory element to store it. To do this, the processing element sends a message including the number to be conveyed, referred to herein as "payload" of the message, and another number designating a particular element where the number is to sent, referred to herein as the "address" of the message. The chip typically includes numerous conductors interconnecting the working elements with one another and a routing circuit which may include switches which route signals along particular set conductors in response to a particular address.

Because the chiplets in a device are structurally identical with one another, the range of addresses within each chiplet is identical to the range of addresses in every other chiplet. However, to allow the chiplets to work together, working elements of each chiplet must communicate with the working elements of other chiplets. It would be desirable to provide for such communication with relatively simple circuitry within each chiplet and without significant complexity in software. The present disclosure addresses these needs.

SUMMARY

An aspect of the present disclosure provides for a data processing device. A data processing device according to this aspect of the invention includes a substrate and a plurality of structurally identical chiplets mounted to the substrate and interconnected to one another. Each one of the chiplets includes a plurality of working elements, at least one of the working elements being responsive to software commands to generate messages, each message including a payload and a global address within a global range of global addresses. Each chiplet also includes a range circuit operative to provide one or more values defining a chiplet range of global addresses for the chiplet, the chiplet range for each one of the plurality of chiplets may be mutually exclusive with the chiplet range for any other one of the plurality of chiplets. According to some examples, the chiplet range for each one of the plurality of chiplets may be non-overlapping with the chiplet range for any other one of the plurality of chiplets. Each chiplet further includes a translation circuit operative to receive messages and translate the global addresses of the message to local addresses, and a local routing circuit connected to the translation circuit for routing the payloads of messages to working elements within the chiplet responsive to local address. Each chiplet further includes an evaluation circuit operative to accept messages from the working elements of the chiplet and: when the global address of a message from a working element of the chiplet is within the chiplet range, pass the message to the translation circuit of the chiplet; and when the global address of the message of a message from a working element of the chiplet is outside the chiplet range, dispatch the message to one or more other ones of the plurality of chiplets. The evaluation circuit is also operative to accept messages from the other ones of the plurality of chiplets, and, when the global address of a message received from another one of the plurality of chiplets is within the chiplet range, pass the message to the translation circuit.

In an example, the evaluation circuit of each chiplet is operative to accept messages from the other ones of the plurality of chiplets, and, when the global address of a message received from another one of the plurality of chiplets is within the chiplet range, pass the message to the translation circuit.

In another example, the plurality of chiplets includes at least three chiplets arranged in an ordered array having first and second opposite directions, with each chiplet being directly connected to at least one neighboring chiplet in at least one of the first and second directions. In yet another example, at least one chiplet is directly connected to a next neighboring chiplet in the first direction and directly connected to another next neighboring chiplet in the second direction. In yet another example, the evaluation circuit of each chiplet is operative to dispatch messages having global addresses above the chiplet range to a next neighboring chiplet in the first direction and to dispatch messages having global addresses below the chiplet range to a next neighboring chiplet in the second direction. In yet another example, the array is a linear array having opposite ends and wherein chiplets at opposite ends of the array are interconnected with one another only through one or more chiplets between the ends. In yet another example, the array is a ring array, wherein every chiplet in the array is directly connected to a next neighboring chiplet in the first direction and directly connected to another next neighboring chiplet in the second direction.

In yet another example, the evaluation circuit of each chiplet is operative to, when a message received from a working element of the chiplet is outside the chiplet range, dispatch the message to all of the other chiplets in the plurality of chiplets. In yet another example, the evaluation circuit of each chiplet is operative to, when a message received from another chiplet is outside the chiplet range, ignore the message.

In yet another example, the substrate includes a plurality of identification conductors. In yet another example, the range circuit of each chiplet is connected to a different one of the plurality of identification conductors, the range circuit of each chip including a circuit for determining the chiplet range for the chiplet from the identity of the connected identification conductor. In yet another example, the range circuit of each chiplet includes a register for holding one or more user-defined parameters and the range circuit is operative to define the chiplet range based on the user-defined parameters.

Another aspect of the present disclosure provides for a method of operating a data processing device including a substrate and a plurality of structurally identical chiplets mounted to the substrate and interconnected to one another. The method includes: establishing a chiplet range of global addresses for each chiplet, the chiplet range for each one of the plurality of chiplets being mutually exclusive with the chiplet range for any other one of the plurality of chiplets; directing software commands to working elements in each chiplet, at least one of the working elements being responsive to software commands to generate messages, each message including a payload and an global address within a global range of global addresses encompassing the chiplet ranges of all of the chiplets, the software commands used in all of the chiplets being based on a common global address table; when the global address of a message from a working element of a chiplet is within the chiplet range that chiplet, actuating a translation circuit within the chiplet to translate the global address to a local address within that chiplet and routing the message to a working element of that chiplet based on the local address; and when the global address of the message of a message from a working element of a chiplet is outside the chiplet range for that chiplet dispatching the message to one or more other ones of the plurality of chiplets. In some examples, the chiplet range for each one of the plurality of chiplets may be non-overlapping with the chiplet range for any other one of the plurality of chiplets.

In an example, the method further includes actuating each chiplet to accept messages from the other ones of the plurality of chiplets. In another example, when the global address of a message received from another one of the plurality of chiplets is within the chiplet range of that chiplet, the method further includes actuating the translation circuit within the chiplet to translate the global address to a local address and routing the message to a working element of that chiplet based on the local address.

In yet another example, the method further includes receiving a message from a first one of the plurality of chiplets in a second one of the plurality of chiplets, determining in the second one of the plurality of chiplets that the global address of the message is outside of the chiplet range of the second one of the chiplets, and, responsive to that determination, retransmitting the message to a third one of the plurality of chiplets.

Yet another aspect of the present disclosure provides for a non-transitory computer readable medium for storing instructions that, when executed by one or more processors, cause the one or more processors to perform operations for a data processing device that includes a substrate and a plurality of chiplets mounted to the substrate and interconnected to one another. The operations include: establishing a chiplet range of global addressers for each chiplet, the chiplet range for each one of the plurality of chiplets not overlapping with the chiplet range for any other one of the plurality of chiplets; directing software commands to working elements in each chiplet, at least one of the working elements being responsive to software commands to process data and generate messages, each message including a payload and a global address within a global range of global addresses encompassing the chiplet ranges of all of the chiplets, the software commands used in all of the chiplets being based on a common global address table; when the global address of a message from a working element of a chiplet is within the chiplet range for that chiplet, actuating a translation circuit within the chiplet to translate the global address to a local address within that chiplet and routing the message to a working element of that chiplet based on the local address; and when the global address of the message of a message from a working element of a chiplet is outside the chiplet range for that chiplet, dispatching the message to one or more other ones of the plurality of chiplets.

In an example, the operations further include actuating each chiplet to accept messages from the other ones of the plurality of chiplets. In another example, when the global address of a message received from another one of the plurality of chiplets is within the chiplet range of that chiplet, the operations further include actuating the translation circuit within the chiplet to translate the global address to a local address and routing the message to a working element of that chiplet based on the local address.

In yet another example, the operations further include receiving a message from a first one of the plurality of chiplets in a second one of the plurality of chiplets, determining in the second one of the plurality of chiplets that the global address of the message is outside of the chiplet range of the second one of the chiplets, and, responsive to that determination, retransmitting the message to a third one of the plurality of chiplets.

BRIEF DESCRIPTION OF THE DRAWINGS

FIG. 1 depicts an example block diagram of a device according to aspects of the disclosure.

FIG. 2 depicts an example block diagram of one part of the device according to aspects of the disclosure.

DETAILED DESCRIPTION

Figure 3:
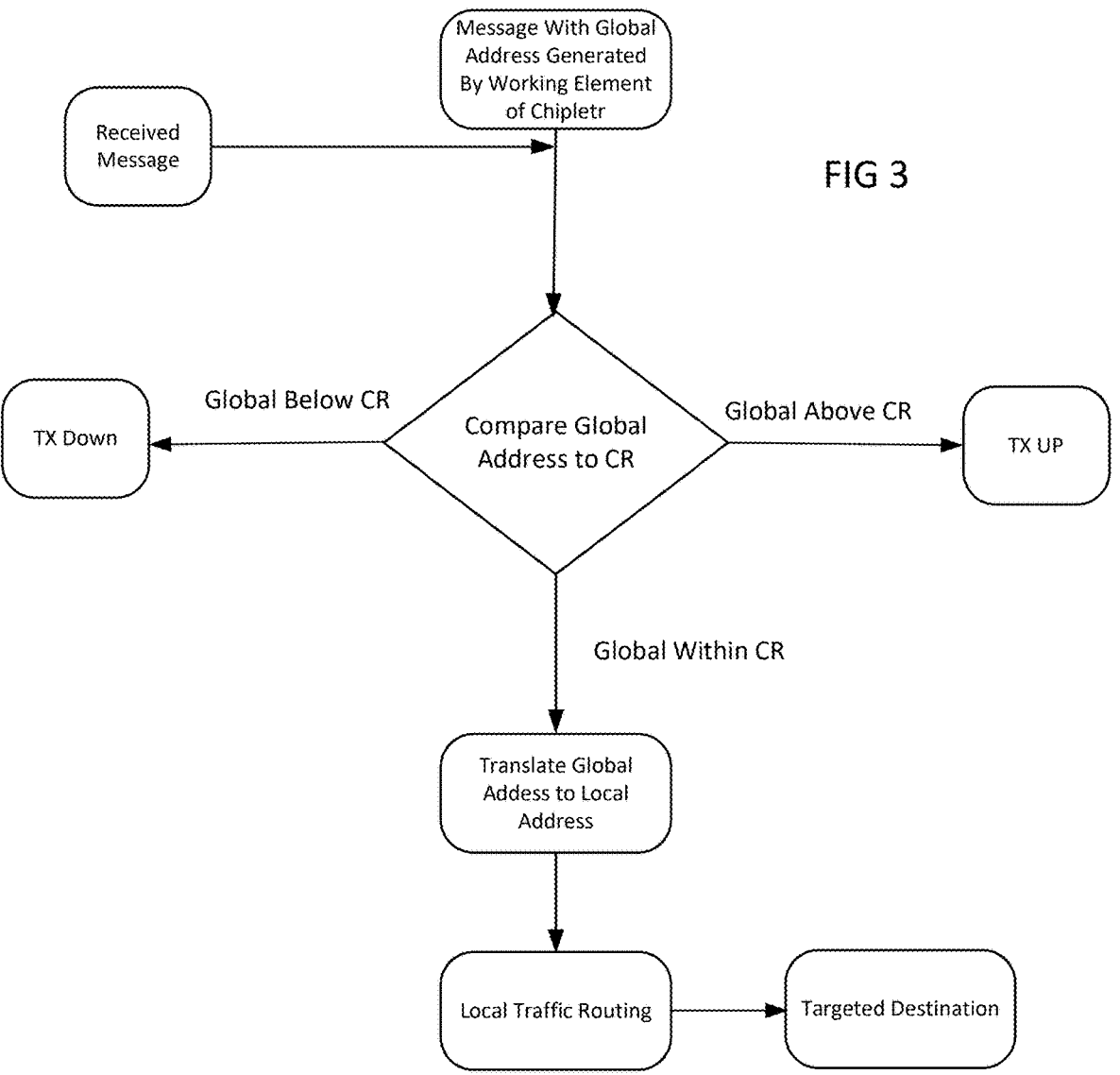
FIG. 3 depicts an example flowchart depicting certain operations using the device according to aspects of the disclosure.

FIG. 1 depicts a device 10 according to one implementation of the present disclosure. The device 10 includes a substrate 12 such as a printed circuit panel and four structurally identical chiplets 14a, 14b, 14c, and 14d mounted to the substrate. The device 10 also includes an additional element 16 which handles tasks such as communication with external elements of a computer incorporating the device 10. The chiplets are connected by conductors 18 and 20 schematically shown as arrows in FIG. 1 in an ordered array having a first direction, also referred to as "up" and a second, opposite direction, also referred to as "down". Chiplet 14a is at one end of the array, whereas chiplet 14d is at the opposite end. Each chiplet has an ordinal position in the array as follows:

| Chiplet | Ordinal Position |
| --- | --- |
| 14a | 0 |
| 14b | 1 |
| 14c | 2 |
| 14d | 3 |

As further explained below, each chiplet can communicate with each neighboring chiplet in the array. Thus, chiplet 14a can communicate with chiplet 14b; chiplet 14b can communicate with neighboring chiplets 14a and 14c, and so on. Chiplet 14d can communicate with additional element 16 as well. As used herein, the expression "neighboring chiplet" refers to a chiplet in the next ordinal position in the array, in either direction of the array.

One chiplet 14b is depicted in FIG. 2 along with a portion of substrate 12. Chiplet 14b includes a first receiver 22a for receiving messages sent from chiplet 14a along one set of conductors 18a on substrate 12, and a first transmitter 24a for sending messages along a separate set of conductors 18b on the substrate to chiplet 14c. Chiplet 14b also includes a second receiver 22a for receiving messages from chiplet 14c along another set of conductors 20b on the substrate, and a second transmitter 24b for sending messages to chiplet 14a along a further set of conductors 20a on the substrate. The transmitters transform the signals constituting a message from a format used in communication within the chiplet to a format suitable for transmission on the conductors of the substrate. For example, the transmitters may change the current or voltage level, the timing of the signals, and may add error correction codes or the like. The receivers perform the reverse transformation.

Chiplet 14b includes working elements 30. The working elements 30 are the elements which process and store information such as data and software instructions during operation of the device. For example, the working elements 30 may include one or more arithmetic processors and typically include multiple memory locations such as registers, random-access memory devices and the like. These elements communicate with by sending messages including information such as data or instructions constituting a message payload and an address in the form of a number. The chiplet 14b further includes a local routing circuit 32 which is operative to route messages to working elements 30 of the chiplet 14b according to a local address within a range of local addresses. For example, if there are 5000 possible destinations within the working elements 30 of the chiplet 14b, local routing circuit 32 is arranged to react to each number in the range from 1 to 5000 by directing the message payload along a particular set of conductors 34 so that the payload reaches a particular working element corresponding to that number. Although common, e.g., decimal, numbers are used in this discussion for ease of understanding, in practice the addresses typically are in binary number format.

However, the range of local addresses decipherable by the local routing circuit 32 does not include addresses for the working elements of the other chiplets in the device or for the additional element 16. A larger set of addresses, referred to herein as "global addresses" is needed. Again, using the example of 5000 destinations within each chiplet, the four chiplets 14a-14b require 20,000 unique global addresses, plus additional global addresses associated with the additional element. Working elements 30 of each chiplet are arranged to send messages with global addresses having any value within the set of global addresses.

Chiplet 14b further includes a range circuit 40. Range circuit 40 is operative to provide one or more parameters defining a range of global addresses associated with the particular chiplet. This range of global addresses is referred to herein as the "chiplet range" of that chiplet. The chiplet ranges are unique and mutually exclusive, so that a particular global address belongs to only one chiplet range. In this example, each chiplet range is a continuous range encompassing all integers between a lower bound and an upper bound. Desirably, the chiplet ranges are contiguous. That is, within the set of global addresses associated with the chiplets, there are no unused numerical values between chiplet ranges; the lower bound of each chiplet range is equal to the upper bound of the next lower chiplet range plus 1. Also, in this example each chiplet range encompasses a number of values equal to, or only slightly greater than, the number of local addresses in a single chiplet. This minimizes the number of bits necessary to represent the global addresses, which in turn reduces the number of individual elements in circuits used to generate and process the global addresses. Also, because the global addresses do not include extra bits to designate particular chiplets, the software programming is simplified. Desirably, the chiplet ranges assigned to chiplets 14a-14d have values in the same order as the ordinal numbers of the chiplets in the array. In the example with 5000 addresses per chiplet, the chiplet ranges are as follows:

| Chiplet | Ordinal | Lower Bound | Upper Bound |
| --- | --- | --- | --- |
| 14a | 0 | 1 | 5000 |
| 14b | 1 | 5001 | 10000 |
| 14c | 2 | 10001 | 15000 |
| 14d | 3 | 15001 | 20000 |

In this example, global addresses above 20000 are associated with the additional element 16.

Range circuit 40 includes a chiplet identification circuit 42. The substrate 10 includes four chiplet identification conductors 44, all of which are connected to a source of an electrical potential. Each identification conductor 44 is associated with an ordinal position, e.g., 0 to 3, in the chiplet array. The chiplet ID circuit 42 has four inputs 45, also corresponding to the four ordinal positions. However, only the input 45-1 is connected to identification conductor 44-1, as symbolized by the black dot 46 denoting a connection; the remaining inputs 45-0, 45-2 and 45-3 are unconnected. Chiplet ID circuit 42 detects an electrical potential on input 1 and outputs a value corresponding to the ordinal position of the chiplet. The chiplet ID circuits of the other chiplets function in the same manner but have different inputs connected to different identification conductors, so that the chiplet ID circuit of each chiplet supplies a value representing the ordinal position of the particular chiplet.

Range circuit 40 includes a further circuit 48 to provide parameters defining the chiplet range based on the ordinal position value from the chiplet ID circuit 42. For example, the parameters may be stored in a lookup table in a permanent memory element incorporated in the circuit. The ordinal position is used as an index in the lookup table. In this example, the stored parameters may be a lower parameter equal to the lower bound of the chiplet range minus 1, and an upper parameter equal to the upper bound of the chiplet range.

Chiplet 14b further includes an evaluation circuit 50 connected to range circuit 48. The evaluation circuit 50 includes a first comparator 52 arranged to compare a global address with the lower parameter supplied by the range circuit, issue a high signal when the global address is greater than the lower parameter and a low signal when this is not the case. A second comparator 54 is arranged to compare a global address with the upper parameter supplied by the range circuit, issue a high signal if the global address is above the upper parameter, and issue a low signal if this is not the case. The evaluation circuit 50 further includes a logic circuit 56 connected to the comparators. The logic circuit 56 is arranged to issue an in-range signal if comparator 52 issues a high signal and comparator 54 issues a low signal; to issue a below-range signal if comparator 52 issues a low signal; and to issue an above-range signal if comparator 54 issues a high signal.

The evaluation circuit 50 further includes a switching circuit arranged to dispatch messages responsive to the signal from the logic circuit as follows: (1) to transmitter 24a responsive to the above-range signal; (2) to transmitter 24b responsive to the below-range signal and (3) to a translation circuit 60 responsive to the in-range signal. Thus, the translation circuit 60 discussed below will receive a message only if the global address of the message is within the chiplet range for chiplet 14b. Messages with global addresses above the chiplet range for chiplet 14b will be dispatched to the neighboring chiplet higher in the ordered array via transmitter 24a, whereas messages with global addresses below the chiplet range will be dispatched to the next lower ordered chiplet, e.g., chiplet 14a, via transmitter 24b. The evaluation circuit receives messages from receivers 22a and 22b, as well as from the working elements 30 of the chip.

Chiplet 14b further includes a translation circuit 60. The translation circuit 60 includes a subtraction circuit 62. The translation circuit 60 receives the lower parameter from range circuit 48. The translation converts the global address of each message to a local address by subtracting the lower parameter from the global address of the message and forwards the message with the local address and payload to local routing circuit 32.

As noted above, the chiplets 14a-14d are identical structures, and perform the same functions, but have apply different chiplet ranges as discussed above. The method of operation of the device is discussed below with reference to FIG. 3.

Assume that a working element chiplet 14a sends a message with a global address of "6100", e.g., a message intended for local address 1100 on die 14b. In the "compare global address with CR" step, the global address is within the chiplet range (CR) for die 1, and thus the message passes to the translation step. In this step, a value equal to the lower bound of the CR for die 1 minus 1, in this case 5000, is subtracted from the global address to yield a local address of 1100. The message with the local address is sent to the local routing circuit of chiplet 14b and then routed to the correct destination, e.g., a target destination.

Chiplet 14a has a different chiplet range, e.g., 1 to 5000. If a working element on chiplet 14a sends the same message with the same global address 6100, the "compare global address with CR" step executed on die 0 will find that the global address is above the CR for chiplet 14a. Chiplet 14a will send the massage to the next higher numbered die in the chain, TX up, in this case chiplet 14b. Chiplet 14b will receive the message "RX UP" and find that the global address range is within the CR for chiplet 14, so that the message will be sent to the translation circuit, processed and locally routed to the target destination.

If a working element on chiplet 14a sends a message with global address of 12555, intended for local address 2555 in chiplet 14c, chiplet 14a will transmit the message, in the first direction, to chiplet 14b, and the chiplet 14b will retransmit the message up to chiplet 14c, where it will be recognized as within the chiplet range and remapped by subtracting 10000 from the global address to yield local address 2555 and routed to the correct working element.

If a working element of a chiplet sends a message below the chiplet range of that chiplet, the message will be transmitted in the second direction, to the next lower ordered die in the chain, TX down, and handled in the same way.

Thus, messages generated by working elements are transmitted in the first or second direction until they reach a chiplet having a chiplet range encompassing the global address of the message. Messages intended for the additional element 16 generated by the working elements of any chip have global addresses above the chiplet range of any of the chiplets, and thus will be transmitted in the first (up) direction until they are transmitted to element 16 by chiplet 14d. Messages sent by the additional element 16 will be transmitted in the second direction, and retransmitted until they reach a chiplet having a chiplet range encompassing the global address of the message.

Numerous variations and combinations of the features discussed above with reference to FIGS. 1-3 can be used. In an example, range circuit 40 can be arranged to provide parameters defining the chiplet range by calculation based on the ordinal position of the chiplet, the size of the chiplet range, and the base address, e.g., the value immediately below the chiplet range of the lowest ordered chiplet. In the example discussed above, the base address is zero and the size of the chiplet range is 5000. The lower parameter for each chiplet can be calculated by multiplying the ordinal position number, e.g., 0, 1, 2, or 3, by the size of the chiplet range and adding this to the base address. The upper parameter is equal to the lower parameter plus the size.

In another example, the range circuit 40 may include user-programmable registers so that the user can enter either the range parameter or the ordinal number of the chip. In this example, the chiplet ID circuit 42 and chiplet identification conductors 44 can be omitted.

In the examples discussed above, additional element 16 passes messages between the chiplets and elements of a computer outside of device 10. In another example, each chiplet may include a communication device connected to elements outside of the computer. In this example, the communication device is treated as a working element of the chiplet, so that the working elements can send messages through the communication device by specifying an appropriate global address. The substrate would include conductors connecting the communication devices of the various chiplets to elements outside of the device.

Figure 4:
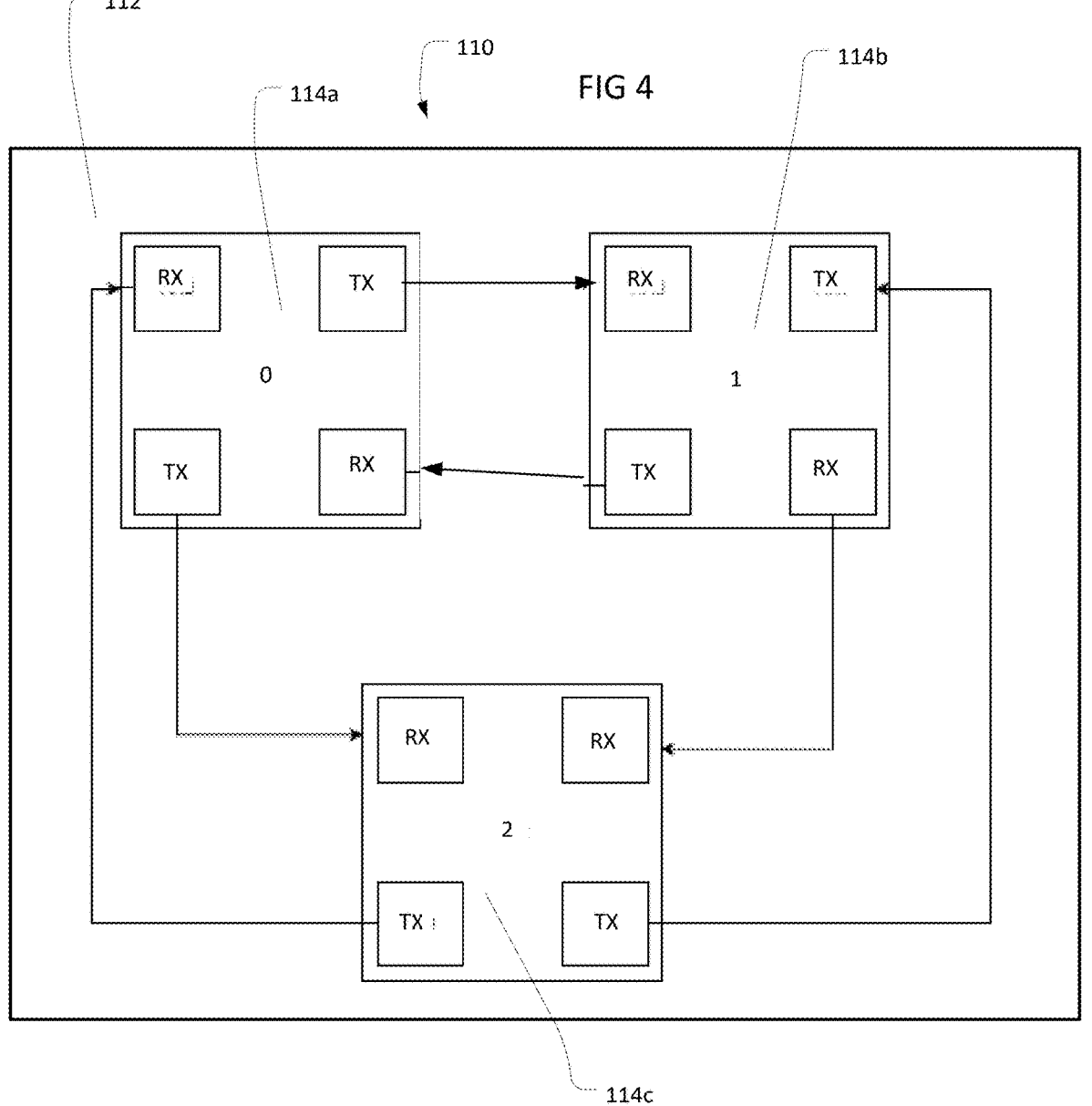
FIG. 4 depicts an example block diagram of a second device according to aspects of the disclosure.

FIG. 4 depicts a device 110 according to another example that includes three chiplets 114a, 114b, and 114c similar to those discussed above mounted to a substrate 112. In this example, the chiplets are connected in a ring configuration rather than a linear configuration as depicted in FIG. 1. The dies are still arranged in an ordered array having two opposite directions. The first direction is the clockwise direction around the array; the ordinal numbers of the chiplets increases in the first direction, from chiplet 114*a*, ordinal number 0, to chiplet 114*b*, ordinal number 1, to chiplet 114*c*, ordinal number 2, until the starting point, chiplet 114*a*, is reached. The chiplets process, transmit, and retransmit messages as discussed above. It should be noted the linear configuration as depicted in FIG. 1 or the ring configuration as depicted in FIG. 4 can include any number of chiplets. The ring configuration reduces the average number of transmissions necessary for a message to reach a chiplet having a chiplet range encompassing the global address of the message. In the example depicted in FIG. 4, with three chiplets, only one transmission is needed for communication between any two chiplets. In a similar ring configuration with four chiplets, a maximum of two transmissions between neighboring chiplets is required for any message. By contrast, in the example depicted in FIG. 1, three transmissions are required for a message to travel between opposite ends of the linear configuration with four chiplets. The example depicted in FIG. 4 may not include an additional element to handle communication with elements of a computer outside of the device, as each chiplet may include an external communication device as a working element.

Figures 5, 6:
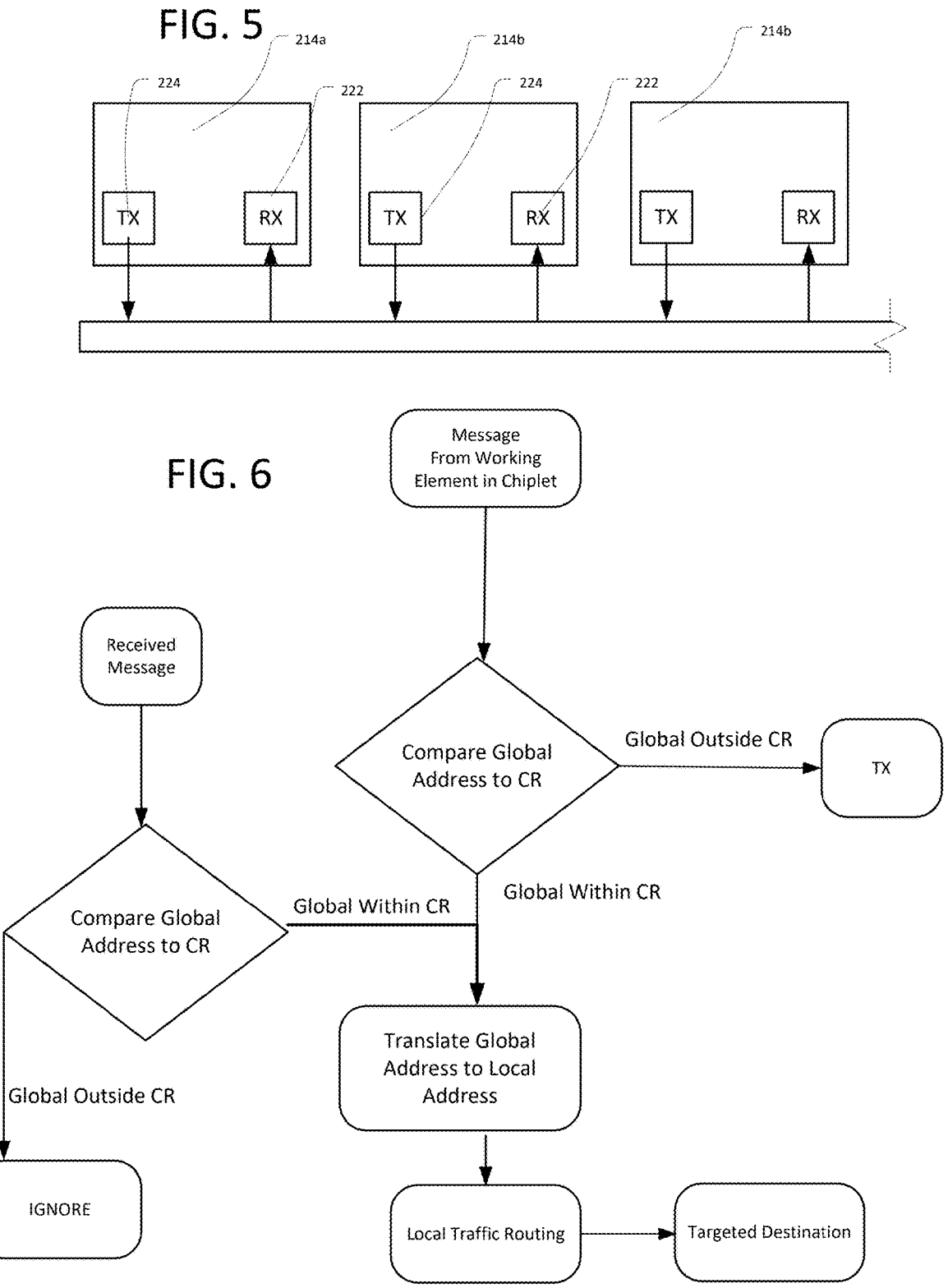
FIG. 5 depicts an example block diagram of a third device according to aspects of the disclosure.
FIG. 6 is an example flowchart depicting certain operations using the third device according to aspects of the disclosure.

In the examples depicted in FIGS. 1-4, the chiplets are connected in a chained arrangement so that at least some messages are transmitted from each chiplet to a neighboring chiplet, and retransmitted if needed to reach the destination. FIG. 5 depicts a device according to another example, where the chiplets 214 are connected on a bus rather than chained. In the device of FIG. 5, each chiplet includes only one transmitter 224 and only one receiver 222 for communication with other chiplets. Any message sent by a transmitter 224 propagates bidirectionally along the bus, and is received by the receivers 222 of all of the other chiplets. The logic used within each chiplet is shown in FIG. 6. If a message originated from a working element within the chiplet has a global address outside of the chiplet range, the message is transmitted to the other chiplets. If a message received from another chiplet has a global address within the chiplet range, it is simply ignored. Messages having global addresses within the chiplet range are sent to the translation circuit and routed locally to the target destination, e.g., a working element in the chiplet.

The evaluation circuit 50 discussed above with reference to FIG. 1 can be modified to provide this different treatment for received messages. In one arrangement, the evaluation circuit appends a flag to each message indicating whether it was received from another chiplet or generated within the chiplet, and the logic circuit takes this into account when determining the fate of the message. In another example, the evaluation circuit may include duplicates of the elements shown in FIG. 1, such as the comparators 52, 54, logic 56, and switching circuit 58, with received messages routed to one set of such elements and with locally generated messages routed to another set of these elements.

In yet another example, the global addresses may selected so that each global address corresponds to a local address concatenated with one or more extra bits denoting the chiplet range. For example, in a device incorporating only two chiplets, the global addresses may be formed by concatenating the local address assigned to a particular working element with one extra bit. Thus, in selection scheme for a device including only two chiplets, only one extra bit is required to form the global address. In this scheme, if a particular working element on each chiplet has a local address of binary 00000001, the global address denoting that working element on chiplet 1 would be binary 100000001, i.e., the local address with a 1 concatenated as most significant bit of the most significant bit of the global address. The global address for the same working element on chiplet 0 would be 000000001, i.e., the local address with a 0 concatenated as the most significant bit of the global address. In similar a selection scheme for a device including up to four chiplets, two extra bits are concatenated with the local address to form the global address. Thus, the global addresses for chiplet 0 would have "00" as the most significant bits; those for chiplet 1 would have "01", those for chiplet 2 would have "10" and those for chiplet 3 would have "11". In further variants of this approach, the one or more extra bits can be concatenated as the least significant bits of the global address, instead of the most significant bits. In these concatenation schemes, the chiplet range for each chip consists of only those numbers having the bit values associated with each chip in the designated position for the extra bit. The range circuit of each chiplet may provide the values of these bits as parameters defining the chiplet range, and the evaluation circuit may determine whether a global address is within the chiplet range by comparing the values of the extra bits in a global address with the values supplied by the range circuit. The translation circuit may convert the global address to a local address by truncating the global address to remove the extra bits.

All of the examples discussed above provide a significant advantage in that the same set of global addresses can be used in formulating messages to be sent by any chiplet. The software does not need to adjust commands for execution by different chiplets. Typically, a table correlating the name of each element within a device with a binary code address for that element is used to create an executable program from commands written by a programmer. Such a table may correlate an element name, e.g., "operand stack A of chiplet 0", with the binary code address. In the devices and methods discussed above, the address table is the same regardless of which chiplet will execute the command.

The examples discussed above provide this and other advantages with simple, readily implemented hardware elements.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A chiplet comprising:
a plurality of working elements, at least one of the working elements being responsive to software commands to process data; and
one or more circuits operative to:
provide one or more values defining a chiplet range of global addresses for the chiplet, the chiplet range being mutually exclusive with the chiplet range for any other interconnected chiplets;
receive a message including a payload and a global address within a global range of global addresses from the any other interconnected chiplets;
when the global address of the message is within the chiplet range, translate the global address of received message to a local address, and
route the payloads of messages to working elements within the chiplet responsive to the local addresses;
when the global address of the message is outside the chiplet range, dispatch the message to one or more other ones of the interconnected chiplets.

2. The chiplet of claim 1, wherein the one or more circuits are operative to accept messages from the other interconnected chiplets, and, when the global address of a message received from another interconnected chiplet is within the chiplet range, pass the message to a translation circuit.

3. The chiplet of claim 1, wherein when the global address of the message is outside the chiplet range, the one or more circuits are configured to dispatch the message to all of the other chiplets in the plurality of chiplets.

4. The chiplet of claim 2, wherein when the global address of the message is outside the chiplet range, the one or more circuits are configured to ignore the message.

5. The chiplet of claim 1, wherein the one or more circuits are connected to an identification conductor.

6. The chiplet of claim 5, wherein the one or more circuits determine the chiplet range for the chiplet from the identity of the connected identification conductor.

7. The chiplet of claim 1, wherein the one or more circuits includes a register for holding one or more user-defined parameters, wherein the one or more circuits are operative to define the chiplet range based on the user-defined parameters.

8. The chiplet of claim 1, wherein the one or more circuits comprise a range circuit, a translation circuit, a local routing circuit, and an evaluation circuit.

9. A data processing device, comprising:
a plurality of chiplets interconnected to one another, each one of the chiplets having an associated chiplet range of global addresses, the chiplet range for each one of the plurality of chiplets being mutually exclusive with the chiplet range for any other one of the plurality of chiplets, the each one of the chiplets comprising:
a plurality of working elements, at least one of the working elements being responsive to software commands to process data and generate messages, each message including a payload and a global address within a global range of global addresses; and
one or more circuits operative to:
when the global address of a message from one of the a plurality of working element of the chiplet is within the chiplet range, pass the message to a translation circuit of the chiplet; and
when the global address of a message from one of the a plurality of working element of the chiplet is outside the chiplet range, dispatch the message to one or more other ones of the plurality of chiplets.

10. The device of claim 9, wherein the one or more circuits of each chiplet is operative to accept messages from the other ones of the plurality of chiplets, and, when the global address of one of the messages received from another one of the plurality of chiplets is within the chiplet range, pass the one of the messages to the translation circuit.

11. The device of claim 9, wherein the plurality of chiplets includes at least three chiplets arranged in an ordered array having first and second opposite directions, with each chiplet being directly connected to at least one neighboring chiplet in at least one of the first and second directions.

12. The device of claim 11, wherein at least one chiplet is directly connected to a next neighboring chiplet in the first direction and directly connected to another next neighboring chiplet in the second direction.

13. The device of claim 12, wherein an evaluation circuit of each chiplet is operative to dispatch messages having global addresses above the chiplet range to a next neighboring chiplet in the first direction and to dispatch messages having global addresses below the chiplet range to a next neighboring chiplet in the second direction.

14. The device of claim 11, wherein the array is a linear array having opposite ends and wherein chiplets at opposite ends of the array are interconnected with one another only through one or more chiplets between the ends.

15. The device of claim 11, wherein the array is a ring array, wherein every chiplet in the array is directly connected to a next neighboring chiplet in the first direction and directly connected to another next neighboring chiplet in the second direction.

16. The device of claim 9, wherein an evaluation circuit of each chiplet is operative to, when a message received from a working element of the chiplet is outside the chiplet range, dispatch the message to all of the other chiplets in the plurality of chiplets.

17. The device of claim 16, wherein the evaluation circuit of each chiplet is operative to, when a message received from another chiplet is outside the chiplet range, ignore the message.

18. The device of claim 9, comprising a plurality of identification conductors, and wherein a range circuit of each chiplet is connected to a different one of the plurality of identification conductors, the range circuit of each chiplet including a circuit for determining the chiplet range for the chiplet from the identity of the connected identification conductor.

19. The device of claim 10, wherein the one or more circuits of each chiplet includes a register for holding one or more user-defined parameters and are operative to define the chiplet range based on the user-defined parameters.

\* \* \* \* \*